United States Patent Office 3,306,906
Patented Feb. 28, 1967

3,306,906
POLYMETHYLENE 2-BENZOTHIAZOLYL
CARBODITHIOATES
John J. D'Amico, Dunbar, W. Va., assignor to Monsanto
Company, St. Louis, Mo., a corporation of Delaware
No Drawing. Filed Jan. 7, 1966, Ser. No. 519,300
4 Claims. (Cl. 260—306.6)

This invention relates to polymethylene 2-benzothiazolyl carbodithioates represented by the formula

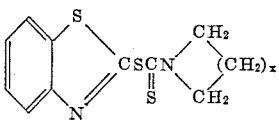

where $x$ is 5 or 6. These compounds are accelerators for the vulcanization of rubber and impart superior processing safety to vulcanizable rubber compositions. The benzothiazolyl group may be substituted, as for example, it may contain a nitro, chloro, lower alkyl, or lower alkoxy group in the benzene ring.

The preparation of the new compounds is described in detail below:

Example 1

A solution was prepared by mixing 62.3 grams (0.55 mole) of heptamethylenimine, 55.7 grams (0.55 mole) of triethylamine, and 200 ml. of ethyl alcohol. To the stirred solution there was then added dropwise, at 5° to 15° C., 41.8 grams (0.55 mole) of carbon disulfide. After stirring for one hour at 25°–30° C., 300 ml. of dimethyl formamide was added in one portion, stirring continued for 5 minutes, and 84.8 grams (0.5 mole) of 2-chlorobenzothiazole then added in one portion. The stirred reaction mixture was heated at 80°–90° C., for 18 hours, cooled to 30° C., added to 2000 grams of ice-water, and stirred at 0°–10° C. for one hour. The resulting precipitate was collected by filtration, washed with water until the washings were neutral to litmus, and air-dried at 25°–30° C. After recrystallization from ethyl acetate, the 2-benzothiazolyl hexahydro-1(2H)-azocine-carbodithioate melted at 104°–105° C. The yield was 99% of a light tan solid analyzing 8.36% nitrogen and 29.90% sulfur compared to 8.69% nitrogen and 29.83% sulfur calculated for $C_{15}H_{18}N_2S_3$.

Example 2

In the procedure of Example 1, an equimolar amount of octamethylenimine was substituted for the heptamethylenimine. The 2 - benzothiazolyl octahydro - 1H-azonine-1-carbodithioate was obtained in 99.5% yield as a white solid melting at 153°–154° C. after recrystallization from ethyl acetate. Analysis gave 8.41% nitrogen and 28.79% sulfur compared to 8.32% nitrogen and 28.58% sulfur calculated for $C_{16}H_{20}N_2S_3$.

The products of the present invention were tested to determine their effectiveness as rubber vulcanization accelerators. As illustrative of accelerating activity and processing saefty in a synthetic rubber stock, butadiene-styrene copolymer rubber was blended in a standard formula as follows:

| | Parts by weight |
|---|---|
| SB–R 1500 | 100 |
| Carbon black | 50 |
| Zinc oxide | 4 |
| Stearic acid | 2 |
| Saturated hydrocarbon softener | 10 |
| Sulfur | 1.75 |

Tests were carried out employing the compounds on an equimolar basis. To the above there was added in separate stocks accelerator as follows:

| Stock | Parts by Weight | Accelerator |
|---|---|---|
| A | 1.45 | 2-benzothiazolyl hexahydro-1(2H)-azocine-carbodithioate. |
| B | 1.51 | 2-benzothiazolyl octahydro-1H-azonine-1-carbodithioate. |

The stocks were cured in the usual manner by heating in a press for various periods of time at 153° C. The physical properties of the optimum cures are recorded:

TABLE I

| Stock | Modulus of Elasticity in lbs./in.$^2$ at 300% Elongation | Tensile at Break in lbs./in.$^2$ | Ultimate Elongation, percent |
|---|---|---|---|
| A | 1,840 | 3,000 | 460 |
| B | 1,780 | 3,000 | 470 |

The processing safety of the stocks was evaluated by heating in a Mooney plastometer. The time in minutes required for the plasticity to increase 5 points above the minimum was determined. These values are a measure of processing safety, higher times indicating greater processing safety. The results are recorded below:

TABLE II

| Stock: | Mooney scorch time at 135° C. |
|---|---|
| A | 38.7 |
| B | 43.9 |

The Mooney scorch of a similar stock containing as the accelerator 1.33 parts by weight of 2-benzothiazolyl 1-piperidinocarbodithioate was 30.4 minutes. The stock containing the 2-benzothiazolyl 1-piperidinocarbodithioate developed an ultimate tensile strength of 1500 pounds per square inch at optimum cure under the same conditions.

Ethylene-propylene terpolymer is the well-recognized and commonly employed name applied to the polymerized rubbery product from polymerization of ethylene, propylene, and a small quantity of a non-conjugated diene. To demonstrate the effectiveness of the compounds of this invention as accelerators for the vulcanization of terpolymers, base formulations were prepared comprising:

| | Parts by weight |
|---|---|
| Ethylene-propylene terpolymer | 100 |
| Zinc oxide | 5 |
| Carbon black | 80 |
| Aromatic processing oil | 40 |
| Sulfur | 1.5 |
| Thiuram monosulfide | 1 |

Addition of the thiuram monosulfide enhances the effectiveness of the compounds for accelerating the vulcanization of terpolymers. The terpolymer used is known commercially as "Nordel 1040." To the above there was added in separate stock 1.0 part of accelerator as follows:

Stock:
    C      2-benzothiazolyl hexahydro-1(2H)-azocinecarbodithioate
    D      2-benzothiazolyl octahydro - 1H - azonine-1-carbodithioate The stocks so compounded were cured in the usual manner by heating in a press at 160° C. The modulus and tensile properties of the vulcanizates at optimum cure and resistance of the unvulcanized compositions to scorch are set forth below:

TABLE III

| Stock | Modulus of Elasticity in lbs./in.² at 300% Elongation | Tensile at Break in lbs./in.² | Ultimate Elong., Percent | Mooney Scorch Mins. at 135° C. |
|---|---|---|---|---|
| C | 1,570 | 2,900 | 500 | 18.7 |
| D | 1,570 | 2,900 | 480 | 19.3 |

The foregoing data show that the compounds of this invention are useful as accelerators and impart greater processing safety as compared to the known 2-benzothiazolyl 1-piperidinocarbodithioate.

Rubber in which the products of the present invention are useful as accelerators include both natural rubber and synthetic rubber. The rubber is preferably a diene polymer rubber by which is meant a rubber containing sufficient diene to render it sulfur vulcanizable. Hydrocarbon diene rubbers are preferred, but also useful are copolymers of diene hydrocarbons and acrylonitrile. Further examples of suitable rubbers are isobutylene copolymerized with a small amount of conjugated diene (butyl rubber), cis-1,4-polyisoprene, and cis-1,4-polybutadiene. In general, the amount of accelerator will fall within the range of 0.1 to 5.0 parts by weight per 100 parts by weight of rubber hydrocarbon.

It was further found that 2-benzothiazolyl hexahydro-1(2H)- azocinecarbodithioate was a fungicide. At a concentration of 10 parts per million, it inhibited the growth of *Phytophthora infestans*, the cause of late blight of solanaceous crops.

It is intended to cover all changes and modifications of the examples of the invention herein chosen for purposes of disclosure which do not constitute departures from the spirit and scope of the invention.

What is claimed is:
1. A compound of the formula

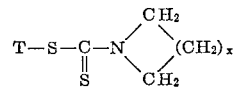

where T is selected from the group consisting of benzothiazolyl, nitro-, chloro-, lower alkyl-, and lower alkoxy-substituted benzothiazolyl, and $x$ is an integer at least 5 but less than 7.

2. A compound of the formula

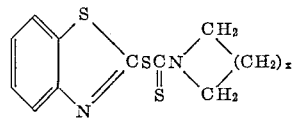

where $x$ is an integer at least 5 but less than 7.

3. A compound of claim 1 where $x$ is 5.
4. A compound of claim 1 where $x$ is 6.

References Cited by the Examiner

UNITED STATES PATENTS

| 2,054,453 | 9/1936 | Teppema | 260—306.6 |
| 2,524,082 | 10/1950 | Ritter | 260—306.6 |

FOREIGN PATENTS 650,776    3/1951    Great Britain.

ALEX MAZEL, *Primary Examiner.*

A. D. ROLLINS, *Examiner.*